United States Patent
Cai et al.

(10) Patent No.: US 8,376,115 B2
(45) Date of Patent: Feb. 19, 2013

(54) BIDIRECTIONAL SELF-LOCKING DEVICE

(75) Inventors: Chengxin Cai, Xiangfan (CN); Yuanhe Gao, Xiangfan (CN)

(73) Assignee: Hubei Aviation Precision Machinery Technology Co., Ltd., Xiangfan, Hubei Province (CN)

( * ) Notice: Subject to any disclaimer, the term of this patent is extended or adjusted under 35 U.S.C. 154(b) by 369 days.

(21) Appl. No.: 12/681,078

(22) PCT Filed: Oct. 10, 2008

(86) PCT No.: PCT/CN2008/072639
§ 371 (c)(1),
(2), (4) Date: Mar. 31, 2010

(87) PCT Pub. No.: WO2009/049541
PCT Pub. Date: Apr. 23, 2009

(65) Prior Publication Data
US 2010/0219037 A1    Sep. 2, 2010

(30) Foreign Application Priority Data

Oct. 12, 2007  (CN) .......................... 2007 1 0163584

(51) Int. Cl.
*F16D 59/00*   (2006.01)
*B60N 2/44*    (2006.01)

(52) U.S. Cl. ...................................... 192/223; 188/134

(58) Field of Classification Search .................. 192/223, 192/223.1; 188/134; 297/344.12
See application file for complete search history.

(56) References Cited

U.S. PATENT DOCUMENTS

| | | | | |
|---|---|---|---|---|
| 2,031,186 | A | * | 2/1936 | Still ............................. 192/223 |
| 2,359,010 | A | * | 9/1944 | Smith ........................ 192/223.1 |
| 3,051,282 | A | * | 8/1962 | Greene ......................... 192/223 |
| 3,587,796 | A | * | 6/1971 | Nestvogel ..................... 192/223 |
| RE27,327 | E | * | 4/1972 | Kalns ............................ 192/223 |
| 6,253,894 | B1 | | 7/2001 | Schumann et al. |
| 6,675,945 | B2 | | 1/2004 | Kim |
| 7,950,511 | B2 | * | 5/2011 | Lorey ........................ 192/223.1 |

FOREIGN PATENT DOCUMENTS

| CN | 1259912 A | 7/2000 |
|---|---|---|
| CN | 22954716 | 12/2002 |

(Continued)

*Primary Examiner* — Richard M. Lorence
(74) *Attorney, Agent, or Firm* — Merchant & Gould P.C.

(57) ABSTRACT

Disclosed is a bidirectional self-locking device including a housing (10) and a gear shaft (20). A first locking device and a second locking device are disposed in the housing (10). When a first locking cam (30) is driven to rotate in a first direction, protuberances on both sides of the first locking cam (30) are respectively in contact with a first locking element (31) and a second locking element (32), such that the first locking element (31) and the second locking element (32) tend to move radially outward and thus tightly press against an inner wall of the housing (10) so as to form a locking engagement. The second locking device has a similar structure to that of the first locking device. When a second locking cam (40) is rotated in a direction opposite to the first direction, a third locking element (41) and a fourth locking element (42) press against the inner wall of the housing (10) so as to form a locking engagement. The first locking cam (30), the second locking cam (40) and the gear shaft (20) are connected through a central shaft (80). A first spring (50) and a second spring (60) cause the first locking device and the second locking device to rotate synchronically.

12 Claims, 8 Drawing Sheets

FOREIGN PATENT DOCUMENTS

| | | |
|---|---|---|
| CN | 1679429 | 10/2005 |
| CN | 201099186 | 8/2008 |
| DE | 4120617 A1 | 12/1992 |
| JP | 2004338426 A | 12/2004 |

* cited by examiner

BIDIRECTIONAL SELF-LOCKING DEVICE

CROSS REFERENCE TO RELATED APPLICATION

This application is a National Stage Application of PCT/CN2008/072639, filed Oct. 10, 2008, which claims the benefit of Chinese Patent Application No. 200710163584.4, filed on Oct. 12, 2007 with State Intellectual Property Office of PRC, and which applications are incorporated herein by reference. To the extent appropriate, a claim of priority is made to each of the above disclosed applications.

FIELD OF THE INVENTION

The present invention relates to the field of machinery technology, in particular to a bidirectional self-locking device for height adjustment for an automobile seat.

BACKGROUND

In a modern automobile, a self-locking transmission or braking mechanism is often used to adjust various positions, for example, to adjust the height of a seat.

A conventional brake mechanism generally has a structure of a torsion spring type, mainly for the purpose of pressing against or releasing from a friction wall by adjusting the size of the diameter of the torsion spring. However, this has an obvious disadvantage that the torsion moment received is small. An adjusting device for an automobile seat is disclosed in CN Patent Application No. 22954716, the adjusting device is connected to four sets of link mechanisms through a sliding core and drives the four sets of link mechanisms to move through a two-stage gear transmission, such that a seat basin connected to the link mechanism may be moved upward and downward, therefore achieving height adjustment of the seat. In this way, however, the structure is complicated and the position of the seat is not secure, which results in that the basin is easy to be raised or lowered in an uncontrolled way when a passenger who seats on the basin wrenches the seat.

SUMMARY OF THE INVENTION

In view of this, a bidirectional self-locking device is provided by the present invention to solve the problems in the prior art that the torsion moment received is small and the locking is not secure.

The bidirectional self-locking device of the present invention is achieved by:

a bidirectional self-locking device, the device comprises a housing, a gear shaft and a central shaft; a first locking device consisting of a first locking cam, a first locking element and a second locking element and a second locking device consisting of a second locking cam, a third locking element and a fourth locking element are disposed in the housing;

the central shaft has one end connected with the gear shaft and the other end sequentially passing through the first locking cam and second locking cam;

the first locking element and the second locking element are disposed at an outer side of the first locking cam so as to be connected end to end, when an external force is present to act on the central shaft through the gear shaft so that the first locking cam tends to rotate in a first direction, the first locking element and the second locking element tend to move radially outward and thus tightly press against an inner wall of the housing so as to form a locking engagement;

the third locking element and the fourth locking element are disposed at an outer side of the second locking cam so as to be connected end to end, when an external force is present to act on the central shaft through the gear shaft so that the second locking cam tends to rotate in a direction opposite to the first direction, the second locking cam is rotated, such that the third locking element and the fourth locking element tend to move radially outward and thus tightly press against the inner wall of the housing so as to form a locking engagement;

a first spring is connected to the first locking element and the fourth locking element, and a second spring is connected to the second locking element and a third locking element, such that as any one of the first locking device and the second locking device is rotated, the other one is rotated synchronically.

Preferably, in the device, a spacer plate is disposed between the first locking cam and the second locking cam, and a central hole is provided on the spacer plate for connecting with the central shaft.

Preferably, in the device, a step is provided at a side of the spacer plate.

Preferably, in the device, arc-shaped steps are provided on the outer circumferential surface of the first locking element, arc-shaped steps are provided on the outer circumferential surface of the second locking element, arc-shaped steps are provided on the outer circumferential surface of the third locking element, and arc-shaped steps are provided on the outer circumferential surface of the fourth locking element.

Preferably, in the device, the first locking element is provided with a groove to which a first retaining post of the first spring is connected, and the fourth locking element is provided with a groove to which a second retaining post of the first spring is connected.

Preferably, in the device, the third locking element is provided with a groove to which a fourth retaining post of the second spring is connected, the second locking element is provided with a groove to which a third retaining post of the second spring is connected.

Preferably, in the device, the first locking cam is provided with a first groove and a second groove at the outer circumference thereof, which respectively correspond to a second protuberance at an inner wall of the second locking element and a first protuberance at an inner wall of the first locking element.

Preferably, in the device, the second locking cam is provided with a third groove and a fourth groove at the outer circumference thereof, which respectively correspond to a third protuberance at an inner wall of the third locking element and a fourth protuberance at an inner wall of the fourth locking element.

Preferably, in the device, the first protuberance, the second protuberance, the third protuberance and the fourth protuberance are all ridge-shaped protuberances.

Preferably, in the device, the central shaft consists of a cylindrical shaft core and a connecting element for connecting with the first locking cam and the second locking cam.

It can be known from the above described technical solutions, compared with the prior art, embodiments of the present invention use two pairs of locking cams and two pairs of locking elements. Two pairs of stopping bosses of the two pairs of locking cams are respectively in contact with the inner walls of the two pairs of locking elements, such that when a torsion is applied, with the central shaft as the center of rotation, on the central shaft clockwise or counterclockwise, the locking elements are moved outward to contact with the inner wall of the housing, and thus the central shaft can not be rotated due to friction, therefore achieving a locking-up.

Meanwhile, as one of the locking cams and the respective locking elements are rotated clockwise or counterclockwise, the other locking cam and the respective locking elements will also be rotated synchronically due to the action of the first spring and second spring, therefore achieving a further locking-up.

DETAILED DESCRIPTION OF THE INVENTION

Figure 1:
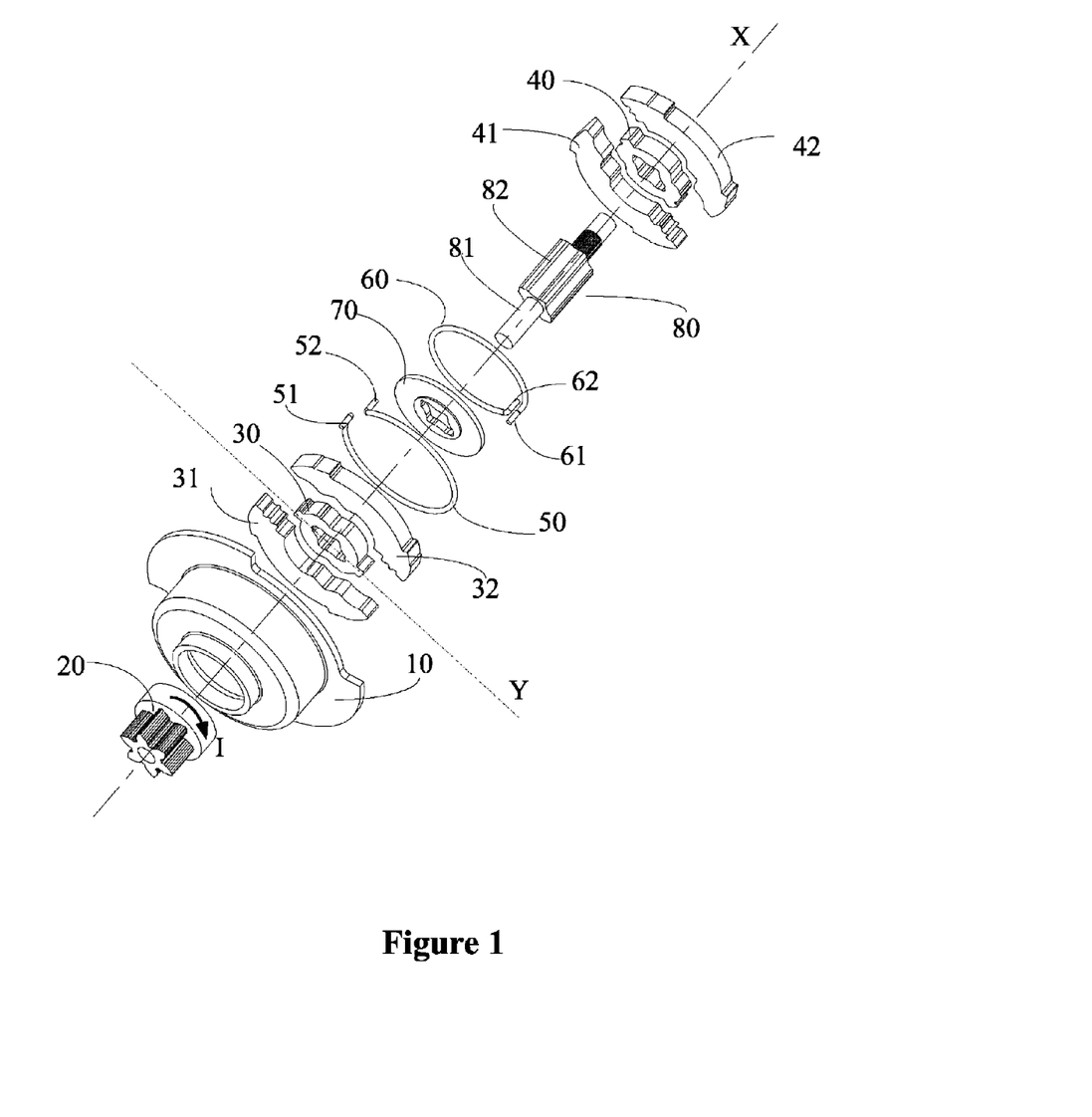
FIG. 1 is a structural schematic view of a bidirectional self-locking device provided by an embodiment of the present invention.

Referring to FIG. 1, in which a structural schematic view of a bidirectional self-locking device provided by an embodiment of the present invention is shown.

The bidirectional self-locking device includes a housing 10, a gear shaft 20, a first locking device consisting of a first locking cam 30, a first locking element 31 and a second locking element 32, a second locking device consisting of a second locking cam 40, a locking element 41 and a fourth locking element 42, a first spring 50 and a second spring 60, a spacer plate 70, and a central shaft 80. The central shaft 80 has one end connected with the gear shaft 20 and the other end sequentially passing through the first locking device, the spacer plate 70 and the second locking device. After rotating by 180 degrees with a line Y as the center, the first locking device takes on the same shape as that of the second locking device.

The central shaft 80 consists of a cylindrical shaft core 81 and a connecting element 82 for connecting with the first locking cam 30 and the second locking cam 40.

Figure 2:
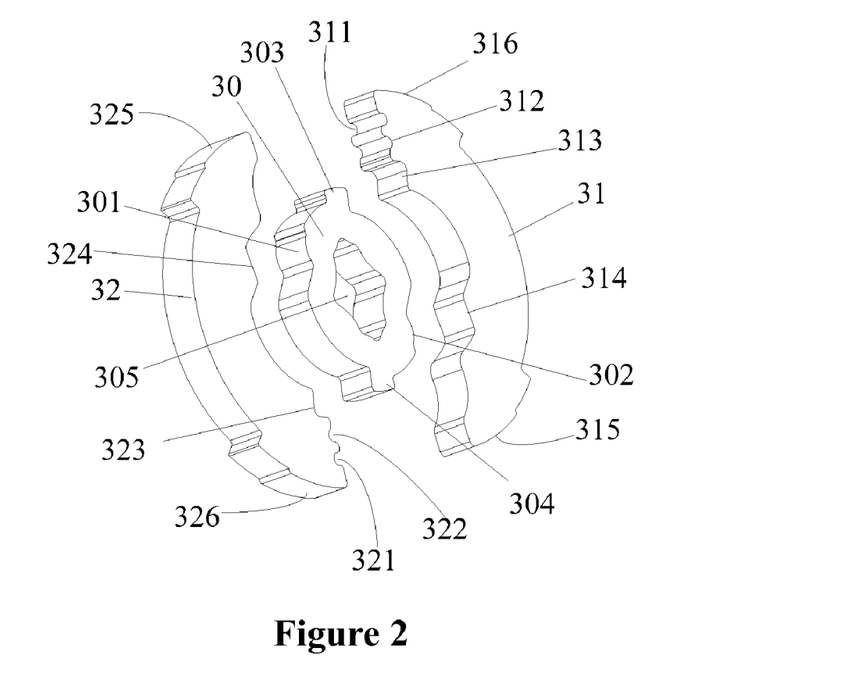
FIG. 2 is a perspective structural schematic view of a first locking device of the bidirectional self-locking device provided by the embodiment of the present invention.
Figure 3:
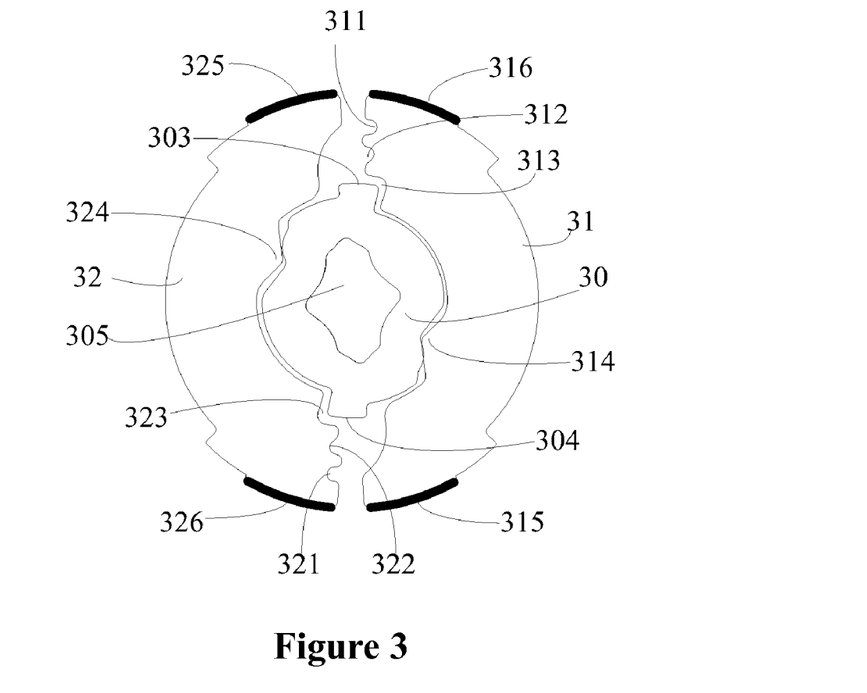
FIG. 3 is a plan structural schematic view of the first locking device of the bidirectional self-locking device provided by the embodiment of the present invention.

FIGS. 2 and 3 respectively show a perspective structural schematic view and a plan structural schematic view of the first locking device provided by the embodiment of the present invention.

The first locking device includes the first locking cam 30, the first locking element 31 and the second locking element 32. The first locking cam 30 is provided with a first groove 301, a second groove 302, a first boss 303 and a second boss 304 at its both sides, and is also provided with a central hole 305 for connecting with the central shaft 80. The first groove 301 and the second groove 302 are centrally symmetric, and the first boss 303 and the second boss 304 are centrally symmetric.

The inner side curve of the first locking element 31 is mated with the outer side curve on one side of the first locking cam 30. The inner side of the first locking element 31 is provided with grooves 311, 312 and 313, and with a first protuberance 314 at a position corresponding to the second groove 302. Furthermore, steps 315 and 316 are provided at the outer side of the first locking element 31.

The second locking element 32 has the same structural shape with the first locking element 31 and is connected end to end with the first locking element 31. That is, the second locking element 32 is overlapped with the first locking element 31 after rotating by 180 degrees about the axis through the central hole 305. Grooves 321, 322 and 323 are provided at the inner side of the second locking element 32. A second protuberance 324 is provided at a position corresponding to the first groove 301. Steps 325 and 326 are provided at the outer side of the second locking element 32.

The first boss 303 and the second boss 304 respectively correspond to the grooves 313 and 323 in position.

The first protuberance 314 and the second protuberance 324 have a ridge shape.

The steps 315, 316, 325 and 326 are arc shaped steps.

Figure 4:
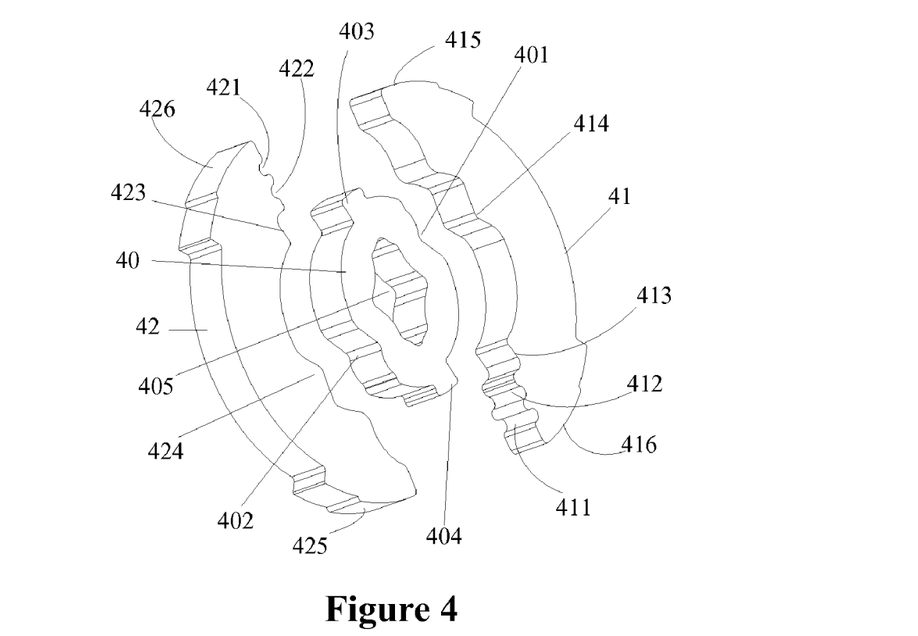
FIG. 4 is a perspective structural schematic view of a second locking device of the bidirectional self-locking device provided by the embodiment of the present invention.
Figure 5:
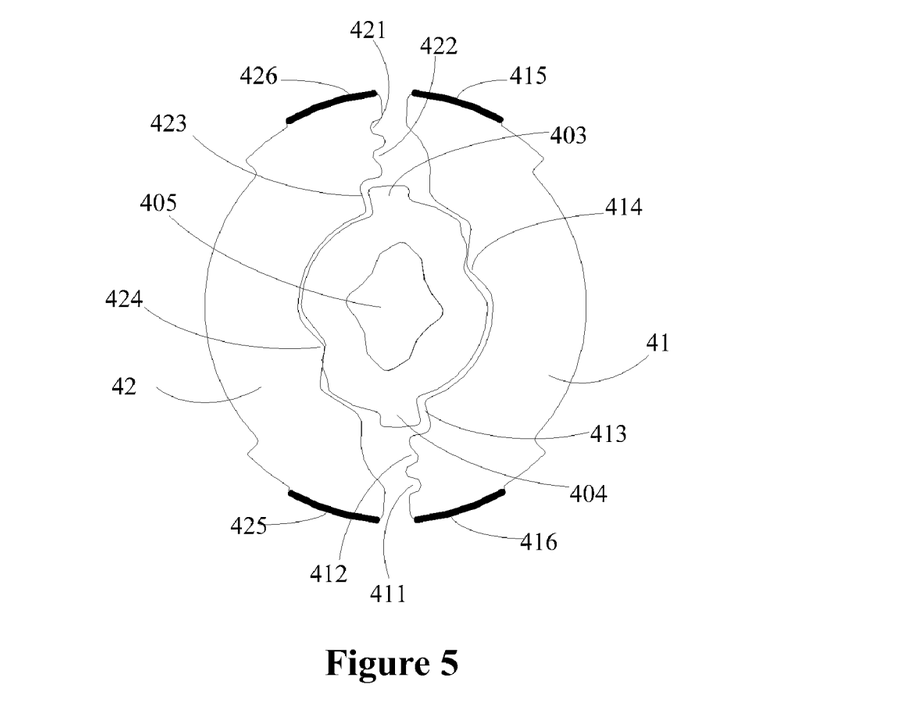
FIG. 5 is a plan structural schematic view of the second locking device of the bidirectional self-locking device provided by the embodiment of the present invention.

FIGS. 4 and 5 are a perspective structural schematic view and a plan structural schematic view of the second locking device of the bidirectional self-locking device provided by the embodiment of the present invention, respectively.

The second locking device includes the third locking cam 40, the third locking element 41 and the fourth locking element 42. The third locking cam 40 is provided with a third groove 401, a fourth groove 402, a third boss 403 and a fourth boss 404 at its both sides, and is also provided with a central hole 405 for connecting with the central shaft 80. The third groove 401 and the fourth groove 402 are centrally symmetric, and the third boss 403 and the fourth boss 404 are centrally symmetric.

The inner side curve of the third locking element 41 is mated with the outer side curve on one side of the third locking cam 40. The inner side of the third locking element 41 is provided with grooves 411, 412 and 413, and with a third protuberance 414 at a position corresponding to the third groove 401. Furthermore, steps 415 and 416 are provided at the outer side of the first locking element 41.

The fourth locking element 42 has the same structural shape with the third locking element 41 and is connected end to end with the third locking element 41. That is, the fourth locking element 42 is overlapped with the third locking element 41 after rotating by 180 degrees. Grooves 421, 422 and 423 are provided at the inner side of the fourth locking element 42. A fourth protuberance 424 is provided at a position corresponding to the fourth groove 402. Steps 425 and 426 are provided at the outer side of the fourth locking element 42.

The third boss 403 and the fourth boss 404 respectively correspond to the grooves 413 and 423 in position.

The third protuberance 414 and the fourth protuberance 424 have a ridge shape.

The steps 415, 416, 425 and 426 are arc-shaped steps.

Figure 6:
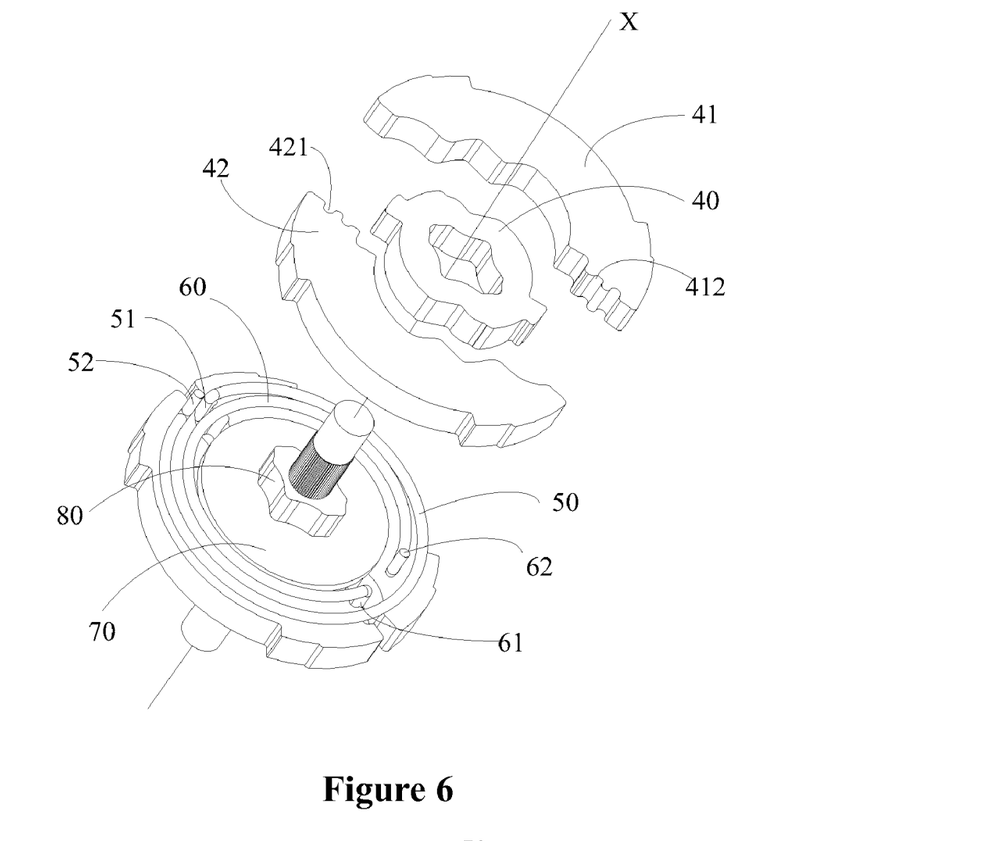
FIG. 6 is a structural exploded schematic view of the first locking device and the second locking device of the bidirectional self-locking device provided by the embodiment of the present invention.
Figure 7:
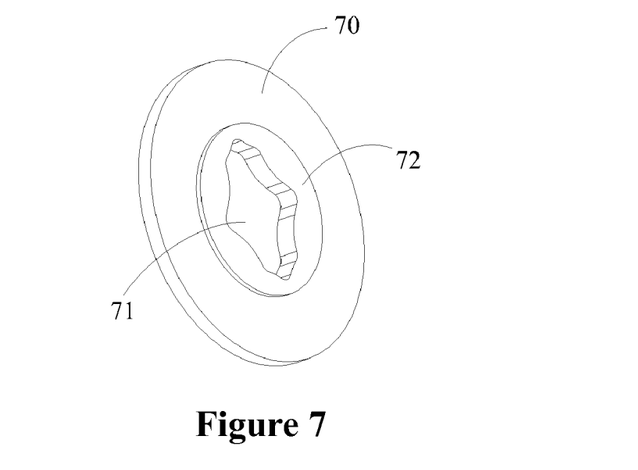
FIG. 7 is a structural schematic view of a spacer plate of the bidirectional self-locking device provided by the embodiment of the present invention.
Figure 8:
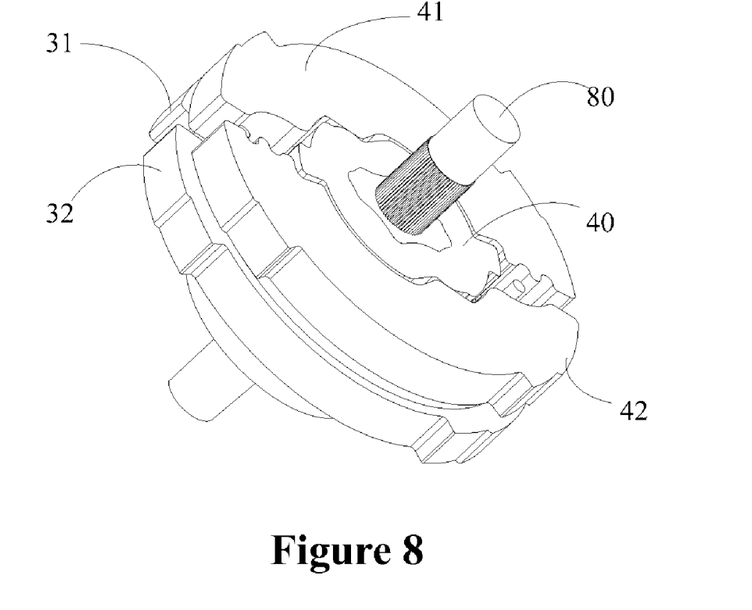
FIG. 8 is a structural assembly schematic view of the first locking device and the second locking device of the bidirectional self-locking device provided by the embodiment of the present invention.

Referring to FIGS. 6, 7 and 8, wherein FIG. 6 is a structural exploded schematic view of the first locking device and the second locking device of the bidirectional self-locking device provided by the embodiment of the present invention, FIG. 7 is a structural schematic view of the spacer plate, and FIG. 8 is an structural assembly schematic view of the first locking device and the second locking device.

As shown in the Figs., the first spring 50 and the second spring 60 are arc-shaped. The first spring 50 is provided with a first retaining post 51 and a second retaining post 52, and the second spring 60 is provided with a third retaining post 61 and a fourth retaining post 62.

The first retaining post 51 of the first spring 50 is connected with the groove 311 of the first locking element 31, the second retaining post 52 of the first spring 50 is connected with the groove 421 of the fourth locking element 42, the third retaining post 61 of the second spring 60 is connected with the groove 322 of the second locking element 32, and the fourth retaining post 62 of the second spring 60 is connected with the groove 412 of the third locking element 41. The central shaft 80 passes through the central hole of the first locking cam (not indicated in FIG. 6) and the central hole 403 of the second locking cam 40. The spacer plate 70 is disposed between the first locking device and the second locking device, such that the first locking device and the second locking device may be spaced apart by the spacer plate 70 so as to provide a space in which the first spring 50 and the second spring 60 can be freely compressed and stretched.

It should be noted that the shape of the central hole 71 of the spacer plate 70 is mated with the sectional shape of the central shaft 80. Also, a protruding step 72 is provided at the side surface of the spacer plate 70 facing toward the first locking device or the second locking device, as shown in FIG. 7, thereby the first locking cam 30 and the second locking cam 40 are spaced apart, ensuring that the first locking cam 30 and the second locking cam 40 will not interfere with the motion of the first spring 50 and the second spring 60, as shown in FIG. 8.

In addition, it should be noted that except for circularity the sectional shape of the central shaft 80 may be of any shape including rhomb, square, rectangle or triangle, etc.

Figure 9:
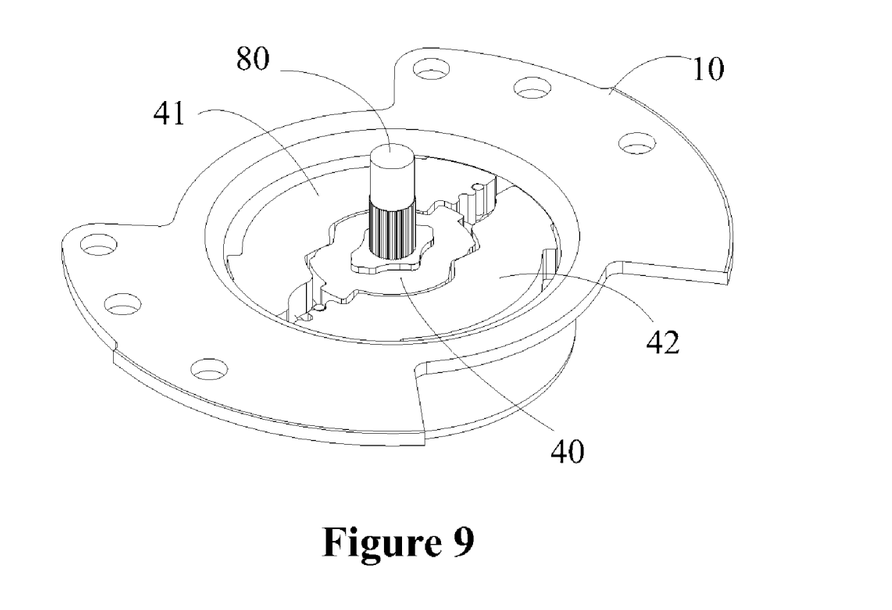
FIG. 9 is an assembly perspective structural schematic view of the first locking device, the second locking device and the housing of the bidirectional self-locking device provided by the embodiment of the present invention.
Figure 10:
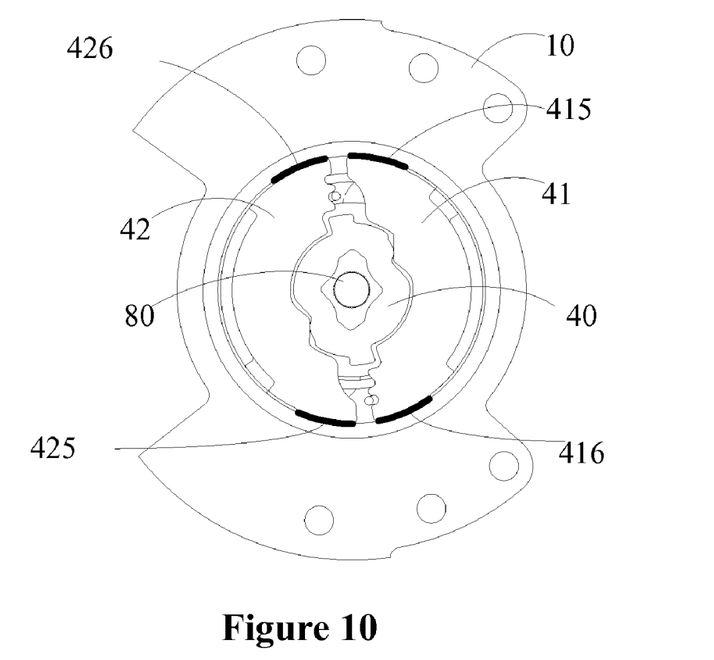
FIG. 10 is an assembly plan structural schematic view of the first locking device, the second locking device and the housing of the bidirectional self-locking device provided by the embodiment of the present invention.

FIGS. 9 and 10 are an assembly perspective structural schematic view and an assembly plan structural schematic view of the first locking device, the second locking device and the housing 10 of the bidirectional self-locking device provided by the embodiment of the present invention, respectively.

Both of the first locking device and the second locking device are disposed within an inner hole of the housing 10.

For better understanding of the technical solution of the present invention by persons skilled in the art, the operating principle and process of the present device will be explained in detail below.

When an external force is present to rotate the gear shaft 20 in a first direction I in FIG. 1, the central shaft 80 follows to rotate synchronically and drives the first locking cam 30 and the second locking cam 40 to rotate.

Figure 11:
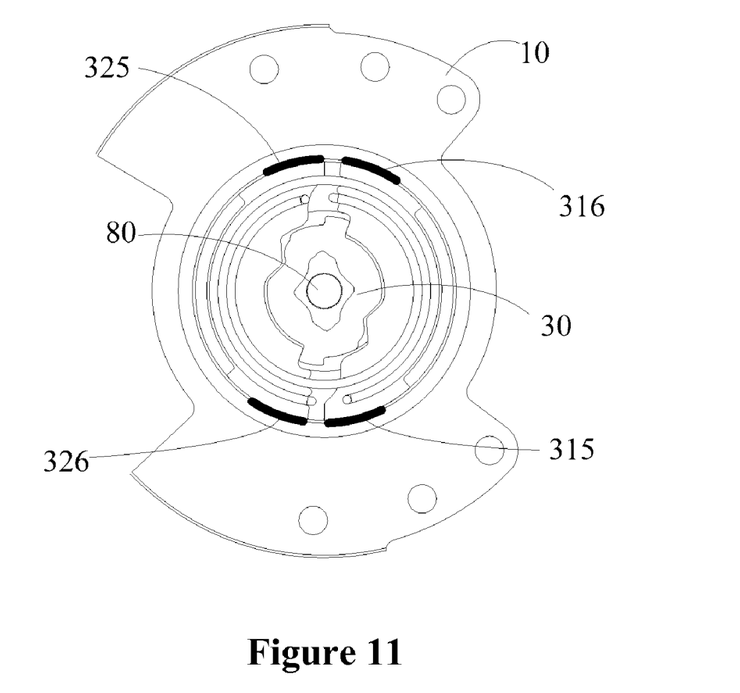
FIG. 11 is a schematic view of the first locking device of the bidirectional self-locking device provided by the embodiment of the present invention in a locking state.

The third boss 403 and the fourth boss 404 on the second locking cam 40 respectively press against the groove 423 of the fourth locking element 42 and the groove 413 of the third locking element 41, at the same time, the third groove 401 and the fourth groove 402 on the outer side of the second locking cam 40 are respectively in contact with the third protuberance 414 of the third locking element 41 and the fourth protuberance 424 of the fourth locking element 42, such that the second locking cam 40, the third locking element 41 and the fourth locking element 42 are rotated synchronically along with the central shaft 80. Meanwhile, as the first locking cam 30 rotates, the outer wall thereof presses against the second protuberance 324 of the second locking element 32 and the first protuberance 314 of the first locking element 31, such that the second locking element 32 and the first locking element 31 tend to move radially outward, and therefore the steps 315 and 316 on the outer side of the first locking element 31 and the steps 325 and 326 of the second locking element 32 tightly press against the inner wall of the housing 10 so as to form a locking engagement, as shown in FIG. 11.

Figure 12:
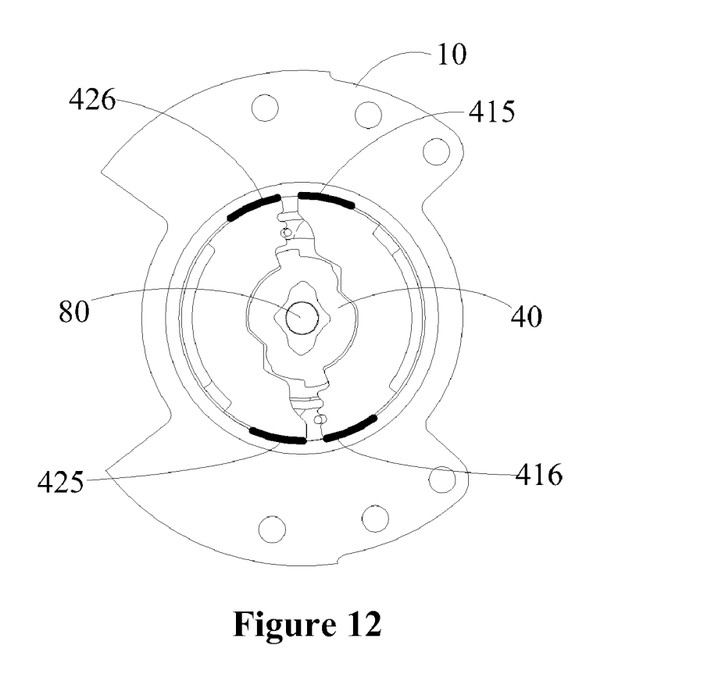
FIG. 12 is a schematic view of the second locking device of the bidirectional self-locking device provided by the embodiment of the present invention in a locking state.

Likewise, when an external force is present to rotate the gear shaft 20 in a direction opposite to the first direction I in FIG. 1, the central shaft 80 follows to rotate synchronically and drives the first locking cam 30 and the second locking cam 40 to rotate. The first boss 303 and the second boss 304 on the first locking cam 30 respectively press against the groove 313 of the first locking element 31 and the groove 323 of the second locking element 32, at the same time, the first groove 301 and the second groove 302 on the outer side of the first locking cam 30 are respectively in contact with the second protuberance 324 of the second locking element 32 and the first protuberance 314 of the first locking element 31, such that the first locking cam 30, the first locking element 31 and the second locking element 32 are rotated synchronically along with the central shaft 80. Meanwhile, as the second locking cam 40 rotates, the outer wall thereof presses against the third protuberance 414 of the third locking element 41 and the fourth protuberance 424 of the fourth locking element 42, such that the third locking element 41 and the fourth locking element 42 tend to move radially outward, and therefore the steps 415 and 416 on the outer side of the third locking element 41 and the steps 425 and 426 of the fourth locking element 42 tightly press against the inner wall of the housing 10 so as to form a locking engagement, as shown in FIG. 12.

Accordingly, whether the gear shaft 20 is rotated clockwise or counterclockwise, the central shaft 80 can not be rotated.

The performing process and principle of the locking function of the bidirectional self-locking device provided by the embodiment of the present invention has been described above. Next, the driving process and principle of the device will be explained in detail below.

Figure 13:
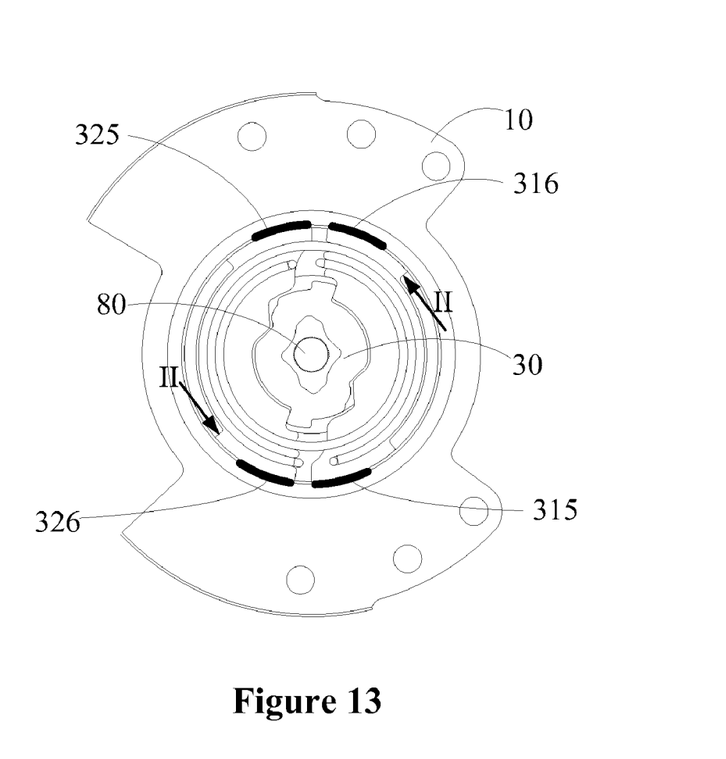
FIG. 13 is a schematic view of the first locking device of the bidirectional self-locking device provided by the embodiment of the present invention in a driving state.

When an external force is applied in a direction II in FIG. 13, the first locking element 31 and the second locking element 32 are rotated synchronically. The groove 313 of the first locking element 31 and the groove 323 of the second locking element 32 respectively press against the first and second bosses 303 and 304 on the first locking cam 30, at the same time, the first protuberance 314 of the first locking element 31 and the second protuberance 324 of the second locking element 32 are respectively in contact with the second groove 302 and the first groove 301, such that the first locking cam 30 is rotated as the first locking element 31 and the second locking element 32 rotate. During this period, the first spring 50 and the second spring 60 are deformed, and the resulting spring force causes the third locking element 41 and the fourth locking element 42 to rotate synchronically in the same direction along with the first locking element 31 and the second locking element 32, and thus drives the second locking cam 40 to rotate synchronically in the same direction, such that the device is always in a self-locking state (i.e., whenever the gear shaft 20 is rotated clockwise or counterclockwise, the central shaft 80 can not be rotated).

Figure 14:
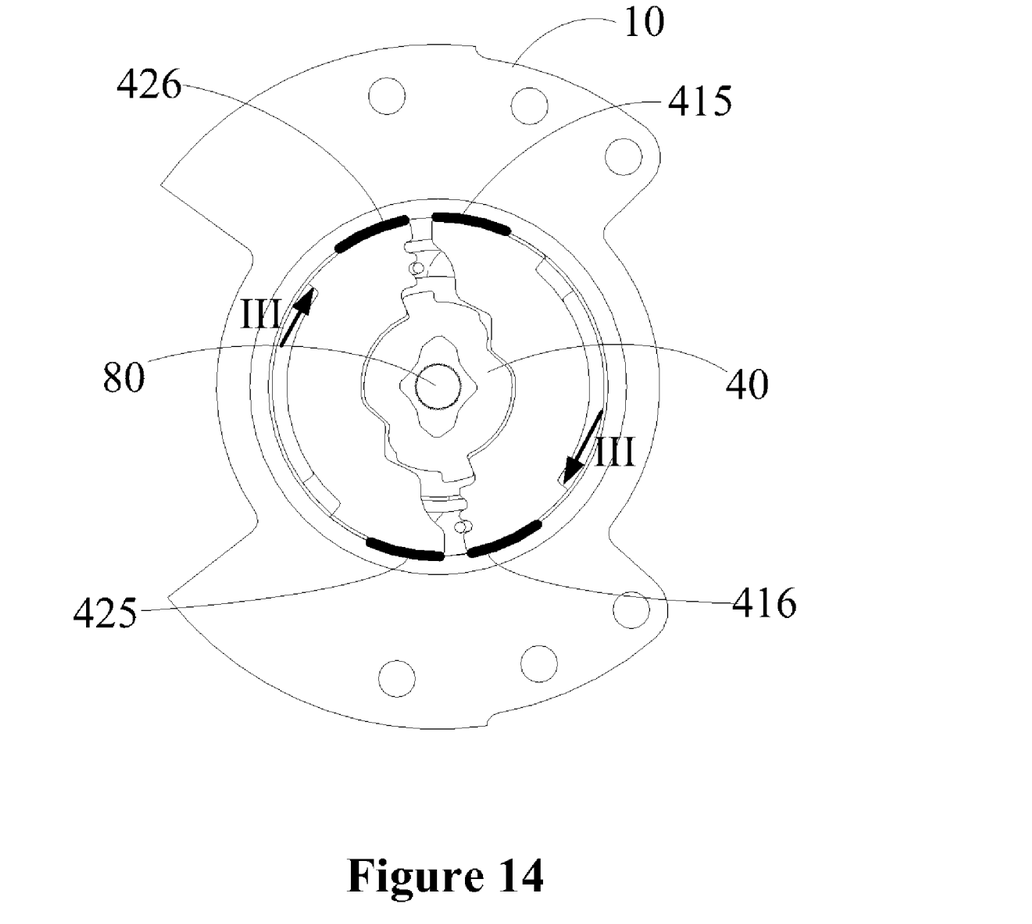
FIG. 14 is a schematic view of the second locking device of the bidirectional self-locking device provided by the embodiment of the present invention in a driving state.

When an external force is applied in a direction III in FIG. 14, the third locking element 41 and the fourth locking element 42 are rotated synchronically. The groove 413 of the third locking element 41 and the groove 423 of the second locking element 42 respectively press against the first and second bosses 403 and 404 on the first locking cam 40, at the same time, the third protuberance 414 of the third locking element 41 and the fourth protuberance 424 of the fourth locking element 42 are respectively in contact with the third groove 401 and the fourth groove 402, such that the second locking cam 40 is rotated as the third locking element 41 and the fourth locking element 42 rotate. During this period, the first spring 50 and the second spring 60 are deformed, and the resulting spring force causes the first locking element 31 and the second locking element 32 to rotate synchronically in the same direction along with the third locking element 41 and the fourth locking element 42, and thus drives the first locking cam 30 to rotate synchronically in the same direction, such that the device is always in a self-locking state (i.e., whenever the gear shaft 20 is rotated clockwise or counterclockwise, the central shaft 80 can not be rotated).

It should be noted that the shapes of the central holes of the locking cams 30 and 40 are mated with the sectional shape of the central shaft 80. The locking cams 30 and 40 are suitable for fine blanking technology, and therefore facilitating reduction in the cost.

In addition, the first locking cam 30, the second locking cam 40, the first locking element 31, the second locking element 32, the third locking element 41 and the fourth locking element are also suitable for fine blanking technology, and therefore facilitating further reduction in the cost.

It should be understood by persons skilled in the art that only the preferred embodiments of the present invention have been disclosed above, and the present invention is not limited thereto. Any non-inventive changes that can be conceived by persons skilled in the art and various improvements and modifications made without departing from the principle of the present invention will all fall within the scope of protection of the present invention.

The invention claimed is:

1. A bidirectional self-locking device, characterized in that, the device comprises a housing, a gear shaft and a central shaft; a first locking device consisting of a first locking cam, a first locking element and a second locking element and a second locking device consisting of a second locking cam, a third locking element and a fourth locking element are disposed in the housing;

the central shaft has one end connected with the gear shaft and the other end sequentially passing through the first locking cam and second locking cam;

the first locking element and the second locking element are disposed at an outer side of the first locking cam so as to be connected end to end, when an external force is present to act on the central shaft through the gear shaft so that the first locking cam tends to rotate in a first direction, the first locking element and the second locking element tend to move radially outward and thus tightly press against an inner wall of the housing so as to form a locking engagement;

the third locking element and the fourth locking element are disposed at an outer side of the second locking cam so as to be connected end to end, when an external force is present to act on the central shaft through the gear shaft so that the second locking cam tends to rotate in a direction opposite to the first direction, the second locking cam is rotated, such that the third locking element and the fourth locking element tend to move radially outward and thus tightly press against the inner wall of the housing so as to form a locking engagement;

a first spring is connected to the first locking element and the fourth locking element, and a second spring is connected to the second locking element and a third locking element, such that as any one of the first locking device and the second locking device is rotated, the other one is rotated synchronically.

2. The device according to claim 1, wherein a spacer plate is disposed between the first locking cam and the second locking cam, and a central hole is provided on the spacer plate for connecting with the central shaft.

3. The device according to claim 2, wherein a step is provided at a side of the spacer plate.

4. The device according to claim 1, wherein arc-shaped steps and are provided on the outer circumferential surface of the first locking element, arc-shaped steps and are provided on the outer circumferential surface of the second locking element, arc-shaped steps and are provided on the outer circumferential surface of the third locking element, and arc-shaped steps and are provided on the outer circumferential surface of the fourth locking element.

5. The device according to claim 1, wherein the first locking element is provided with a first groove, the fourth locking element is provided with a second groove, and the first spring is provided with a first retaining post connected to the first groove and a second retaining post connected to the second groove.

6. The device according to claim 5, wherein the third locking element is provided with a third groove, the second locking element is provided with a fourth groove, the second spring is provided with a third retaining post connected to the fourth groove and a fourth retaining post connected to the third groove.

7. The device according to claim 1, wherein the third locking element is provided with a third groove, the second locking element is provided with a fourth groove, the second spring is provided with a third retaining post connected to the fourth groove and a fourth retaining post connected to the third groove.

8. The device according to claim 1, wherein the first locking cam is provided with a first groove and a second groove at the outer circumference thereof, which respectively correspond to a second protuberance at an inner wall of the second locking element and a first protuberance at an inner wall of the first locking element.

9. The device according to claim 8, wherein the second locking cam is provided with a third groove and a fourth groove at the outer circumference thereof, which respectively correspond to a third protuberance at an inner wall of the third locking element and a fourth protuberance at an inner wall of the fourth locking element.

10. The device according to claim 1, wherein the second locking cam is provided with a third groove and a fourth groove at the outer circumference thereof, which respectively correspond to a third protuberance at an inner wall of the third locking element and a fourth protuberance at an inner wall of the fourth locking element.

11. The device according to claim 10, wherein the first protuberance, the second protuberance, the third protuberance and the fourth protuberance are all ridge-shaped protuberances.

12. The device according to claim 9, wherein the central shaft consists of a cylindrical shaft core and a connecting element for connecting with the first locking cam and the second locking cam.

* * * * *

UNITED STATES PATENT AND TRADEMARK OFFICE
CERTIFICATE OF CORRECTION

| | | |
|---|---|---|
| PATENT NO. | : 8,376,115 B2 | Page 1 of 1 |
| APPLICATION NO. | : 12/681078 | |
| DATED | : February 19, 2013 | |
| INVENTOR(S) | : Cai et al. | |

It is certified that error appears in the above-identified patent and that said Letters Patent is hereby corrected as shown below:

In the Claims

Col. 8, line 58, claim 12: "claim 9, wherein" should read --claim 11, wherein--

Signed and Sealed this
Fourth Day of March, 2014

Michelle K. Lee
*Deputy Director of the United States Patent and Trademark Office*